(12) United States Patent
Iwaki (10) Patent No.: US 12,503,125 B2
(45) Date of Patent: Dec. 23, 2025

(54) AUTOMATIC CONTROL SWITCHING DEVICE

(71) Applicant: ISUZU MOTORS LIMITED, Yokohama (JP)

(72) Inventor: Yuuki Iwaki, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 138 days.

(21) Appl. No.: 18/539,760

(22) Filed: Dec. 14, 2023

(65) Prior Publication Data

US 2024/0239357 A1 Jul. 18, 2024

(30) Foreign Application Priority Data

Jan. 12, 2023 (JP) .................................. 2023-002957

(51) Int. Cl.
*B60W 50/029* (2012.01)
*B60W 30/09* (2012.01)
(Continued)

(52) U.S. Cl.
CPC .......... *B60W 50/029* (2013.01); *B60W 30/09* (2013.01); *B60W 30/0956* (2013.01);
(Continued)

(58) Field of Classification Search
CPC ............... B60W 50/029; B60W 30/09; B60W 30/0956; B60W 40/105; B60W 50/0205; B60W 50/14; B60W 60/0015; B60W 60/0053; B60W 60/0057; B60W 60/0059; B60W 2050/0215; B60W 2050/143; B60W 2050/146; B60W 2540/223; B60W 2050/022; B60W 2520/10; B60W 2554/40; B60W 10/06; B60W 10/18;
(Continued)

(56) References Cited

U.S. PATENT DOCUMENTS

2018/0052463 A1 * 2/2018 Mays .................... G05D 1/021
2018/0088572 A1 3/2018 Uchida et al.
(Continued)

FOREIGN PATENT DOCUMENTS

JP 2016-137819 A 8/2016
JP 2017197183 A * 11/2017
(Continued)

*Primary Examiner* — Brodie J Follman
(74) *Attorney, Agent, or Firm* — Procopio, Cory, Hargreaves & Savitch LLP (57) ABSTRACT

An autonomous driving apparatus that automatically controls the steering and speed of a vehicle to cause the vehicle to travel includes: an abnormality detection part that detects at least one of an abnormality in a drive system of the vehicle and an abnormality in a sensor that detects surrounding situations when the steering and speed of the vehicle are automatically controlled; and an automatic control part that switches the automatic control of the speed to manual control in which the speed is controlled by a driver's operation if an abnormality has been detected by the abnormality detection part, and continues the automatic control of the steering until a predetermined waiting time has passed from the moment at which the automatic control of the speed was switched to the manual control.

16 Claims, 4 Drawing Sheets

(51) Int. Cl.
*B60W 30/095* (2012.01)
*B60W 40/105* (2012.01)
*B60W 50/02* (2012.01)
*B60W 50/14* (2020.01)
*B60W 60/00* (2020.01)

(52) U.S. Cl.
CPC ...... *B60W 40/105* (2013.01); *B60W 50/0205* (2013.01); *B60W 50/14* (2013.01); *B60W 60/0015* (2020.02); *B60W 60/0053* (2020.02); *B60W 60/0057* (2020.02); *B60W 60/0059* (2020.02); *B60W 2050/0215* (2013.01); *B60W 2050/143* (2013.01); *B60W 2050/146* (2013.01); *B60W 2540/223* (2020.02)

(58) Field of Classification Search
CPC ..... B60W 2050/0292; B60W 2540/18; B60W 60/0055
See application file for complete search history.

(56) References Cited

U.S. PATENT DOCUMENTS

| | | | |
|---|---|---|---|
| 2019/0171204 A1* | 6/2019 | Jang et al. | ........... G05D 1/0061 |
| 2020/0079394 A1 | 3/2020 | Masuda et al. | |
| 2020/0307642 A1* | 10/2020 | Tsuji et al. | ............ B60W 50/14 |
| 2022/0135056 A1 | 5/2022 | Masuda et al. | |
| 2022/0234599 A1 | 7/2022 | Tsuji et al. | |

FOREIGN PATENT DOCUMENTS

| | | | |
|---|---|---|---|
| JP | 2020063754 | * | 10/2018 |
| JP | 2018-192865 A | | 12/2018 |
| JP | 2021-095133 A | | 6/2021 |
| JP | 2021-113043 A | | 8/2021 |
| JP | 2022-114995 A | | 8/2022 |
| JP | 2022-134541 A | | 9/2022 |
| JP | 2022-149043 A | | 10/2022 |

* cited by examiner

AUTOMATIC CONTROL SWITCHING DEVICE

CROSS-REFERENCE TO RELATED APPLICATIONS

The present application claims priority to Japanese Patent Application number 2023-2957, filed on Jan. 12, 2023, contents of which are incorporated herein by reference in their entirety.

BACKGROUND OF THE INVENTION

The present disclosure relates to an autonomous driving apparatus that automatically controls traveling of a vehicle.

There is known a technique of ceasing automatic control if an abnormality has been detected during the automatic operation of both a drive system and a steering system of a vehicle. Japanese Unexamined Patent Application Publication No. 2018-192865 discloses a technique for ceasing the automatic operation of both a drive system and a steering system when an abnormality in the drive system (the behavior of a suspension, an engine bay) has been detected.

However, when an abnormality in the drive system of the vehicle has been detected, a driver of the vehicle may not be gripping the steering wheel or putting his/her foot on the accelerator pedal or the brake pedal, so that the driver cannot immediately operate the vehicle. Therefore, if the automatic operation of both the drive system and the steering system is ceased in a case where the driver cannot operate the vehicle immediately, the vehicle is neither automatically controlled nor manually controlled, which may decrease safety.

BRIEF SUMMARY OF THE INVENTION

The present disclosure has been made in view of these points, and its object is to improve safety at the time when an abnormality occurs.

An aspect of the present disclosure provides an autonomous driving apparatus that automatically controls steering and speed of a vehicle to cause the vehicle to travel, the autonomous driving apparatus including: an abnormality detection part that detects at least one of an abnormality in a drive system of the vehicle and an abnormality in a sensor that detects a surrounding situation, when the steering and the speed are automatically controlled; and an automatic control part that switches automatic control of the speed to manual control, in which the speed is controlled by a driver's operation, if an abnormality has been detected by the abnormality detection part, and that continues automatic control of the steering until a predetermined waiting time has passed from a moment at which the automatic control of the speed was switched to the manual control.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Configuration of the Autonomous Driving Apparatus 1]

Figure 1:
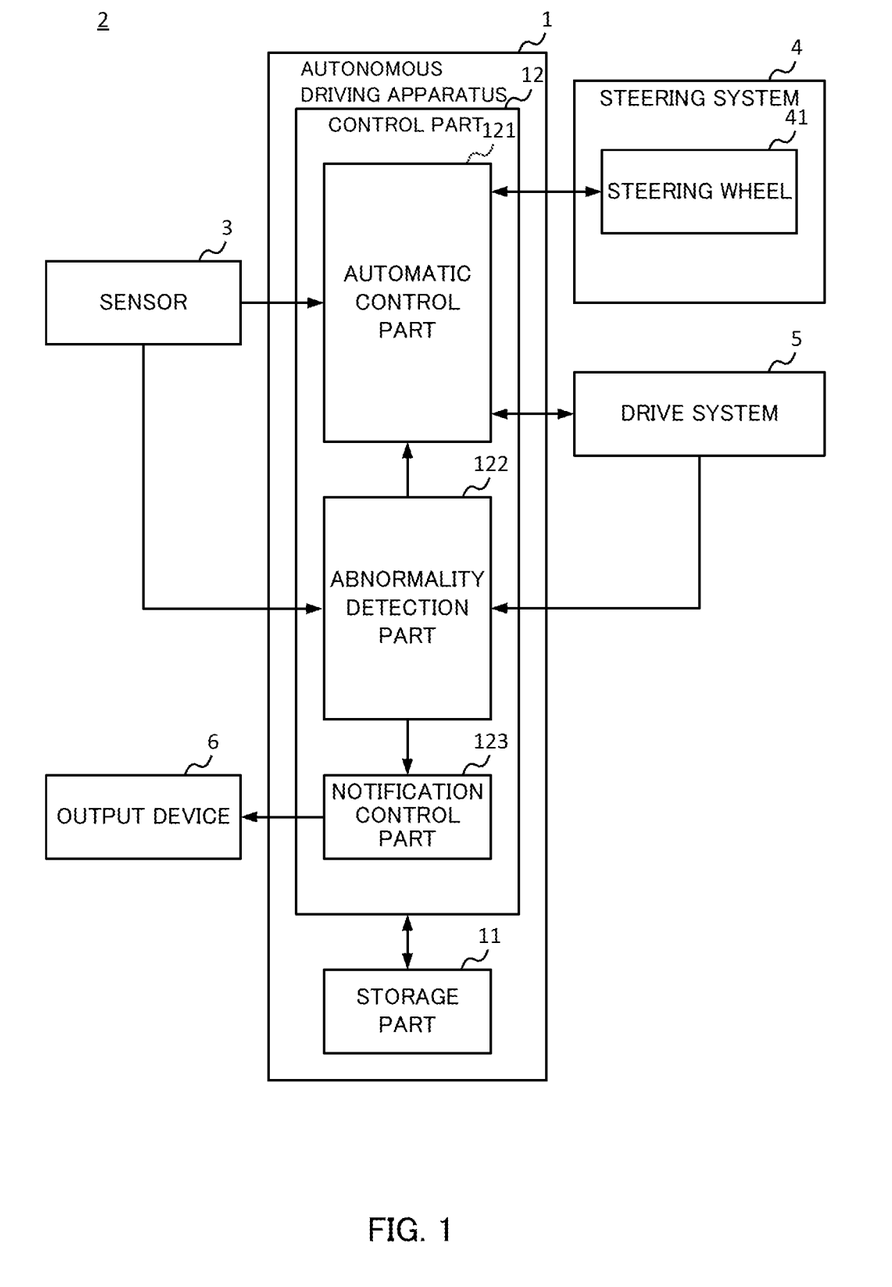
FIG. 1 is a diagram illustrating a configuration of an autonomous driving apparatus.

FIG. 1 is a diagram illustrating a configuration of an autonomous driving apparatus 1. The autonomous driving apparatus 1 is mounted in a vehicle 2, which is an autonomous vehicle. The vehicle 2 includes a sensor 3, a steering system 4, a drive system 5, and an output device 6.

The sensor 3 is a sensor that detects surrounding situations. The sensor 3 includes at least one of an imaging device and a LIDAR, for example. The sensor 3 outputs a detection value detected by at least one of the imaging device and the LIDAR to the autonomous driving apparatus 1. Further, the sensor 3 may detect an object that is around the vehicle 2. For example, the sensor 3 detects a moving object and a stationary object, which are objects around the vehicle 2, on the basis of at least one of a captured image captured by the imaging device and the detection value of the LIDAR. The moving object is another vehicle or a person, and the stationary object is an object on the road, for example.

The steering system 4 is a rack and pinion steering system, and includes a steering wheel 41, which is a steering device, a steering shaft, a rack and pinion, a tie rod, and a kingpin. A driver can change a steering angle of the vehicle 2 by rotating the steering wheel 41. It should be noted that the steering system 4 is not limited to the rack and pinion steering system, and may be a worm and sector steering system or a steering system that utilizes a steering linkage.

The drive system 5 includes a transmission, a propeller shaft, a clutch, a drive shaft, a brake, and an engine. Specifically, the drive system 5 includes a device that operates the clutch, a device that operates the brake, and a fuel injecting device that injects fuel into a cylinder of the engine.

The autonomous driving apparatus 1 automatically controls the steering and speed of the vehicle 2 to cause the vehicle 2 to travel. For example, the autonomous driving apparatus 1 controls the steering system 4 and the drive system 5 on the basis of the detection value detected by the sensor 3, thereby causing the vehicle 2 to travel to a target point. Specifically, the autonomous driving apparatus 1 causes the vehicle 2 to travel to the target point while preventing the vehicle 2 from colliding with the moving object and the stationary object detected by the sensor 3. If an abnormality in at least one of the sensor 3 and the drive system 5 has been detected, the autonomous driving apparatus 1 causes the output device 6 to provide information indicating that an abnormality has been detected.

The output device 6 is at least one of a speaker and a display that outputs information indicating that an abnormality has been detected. The vehicle 2 may be equipped with both the speaker and the display, as the output device 6.

If an abnormality in at least one of the sensor 3 and the drive system 5 has been detected, the autonomous driving apparatus 1 switches the automatic control of the drive system 5 to manual control, and continues the automatic control of the steering system 4. Thus, even though the driver of the vehicle 2 cannot manually operate the steering wheel 41 with his/her hands taken off the steering wheel 41 at the time when the abnormality occurs, the autonomous driving apparatus 1 can prevent the steering of the vehicle 2 from entering a state that is neither under the automatic control nor the manual control. As a result, the autonomous driving apparatus 1 can improve the safety of the vehicle 2. Hereinafter, a configuration of the autonomous driving apparatus 1 will be described in detail.

The autonomous driving apparatus 1 includes a storage part 11 and a control part 12. The storage part 11 includes storage media such as a Read Only Memory (ROM), a Random Access Memory (RAM), and a hard disk. The storage part 11 stores a program executed by the control part 12.

The control part 12 is a calculation resource including a processor such as a Central Processing Unit (CPU). The control part 12 functions as an automatic control part 121, an abnormality detection part 122, and a notification control part 123 by executing a program stored in the storage part 11.

The automatic control part 121 automatically controls the steering and speed of the vehicle 2 to cause the vehicle 2 to travel. For example, the automatic control part 121 controls the steering system 4 and the drive system 5 on the basis of the detection value detected by the sensor 3, thereby causing the vehicle 2 to travel to the target point. Specifically, the automatic control part 121 controls the steering system 4 and the drive system 5 to cause the vehicle 2 to travel to the target point while preventing the vehicle 2 from colliding with the moving object and the stationary object detected by the sensor 3. It should be noted that the automatic control part 121 may detect the moving object and the stationary object around the vehicle 2 on the basis of the detection value detected by the sensor 3.

The abnormality detection part 122 detects at least one of an abnormality in the drive system 5 and an abnormality in the sensor 3. For example, the abnormality detection part 122 detects an abnormality in the sensor 3 and an abnormality in the drive system 5 when the automatic control part 121 is automatically controlling the steering and speed of the vehicle 2. For example, the abnormality in the sensor 3 is an abnormality in a detection value such that a value detected by the sensor 3 is not normal, an abnormality in communication such that communication between the autonomous driving apparatus 1 and the sensor 3 is disrupted, or an abnormality in power supply such that the power supply of the sensor 3 is cut off or cannot be activated.

The abnormality detection part 122 detects an abnormality in the drive system 5. Specifically, the abnormality detection part 122 detects an abnormality in the drive system 5 on the basis of an output value of a sensor that detects the state of components constituting each of the transmission, the propeller shaft, the clutch, the drive shaft, the brake, and the engine included in the drive system 5. Further, the abnormality detection part 122 detects an abnormality in communication such that communication between the autonomous driving apparatus 1 and (i) the device that operates the clutch in the drive system 5, (ii) the device that operates the brake, and (iii) the fuel injecting device, as well as an abnormality in power supply such that the power supply of each device is cut off or cannot be activated, for example.

When the abnormality detection part 122 detects an abnormality, the notification control part 123 causes the output device 6 to provide notification that an abnormality has been detected. For example, the abnormality detection part 122 causes the speaker of the output device 6 to output sound indicating that an abnormality has been detected.

Further, the notification control part 123 causes the display of the output device 6 to display information indicating that an abnormality has been detected.

If an abnormality has been detected by the abnormality detection part 122, the automatic control part 121 switches the automatic control of the speed to manual speed control in which the speed is controlled by the driver's operation. The automatic control part 121 continues the automatic control of the steering until a waiting time has passed from a moment at which the automatic control of the speed was switched to the manual speed control. The waiting time is determined according to a time it takes for the driver of the vehicle 2 to be able to perform a steering control operation in response to the notification. A specific value of the waiting time is 2 seconds, but the embodiment is not limited to this. Even if an abnormality in the sensor 3 and the drive system 5 has been detected, the automatic control part 121 continues the automatic control of the steering, without switching to manual steering control in which the steering is controlled by the driver's operation. As a result, even though the driver cannot manually operate the steering wheel 41 with his/her hands taken off the steering wheel 41, the automatic control part 121 can prevent the steering of the vehicle 2 from entering a state that is neither under the automatic control nor the manual control, which can improve safety.

Figure 2:
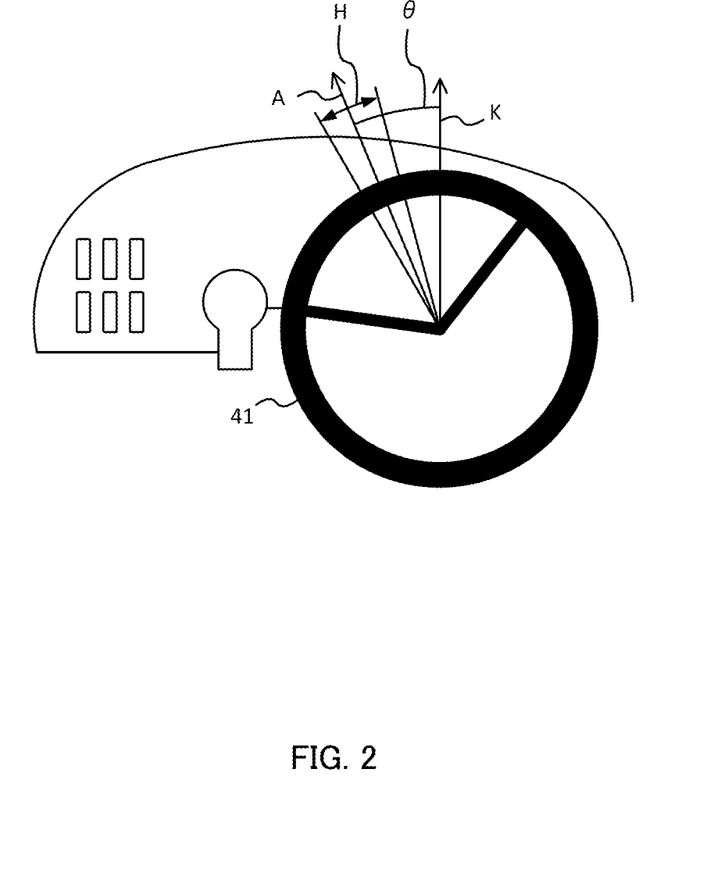
FIG. 2 is a diagram for explaining processing for determining whether a steering control operation has been performed.

If the driver performs the steering control operation by the time when the waiting time has passed from a moment of speed control switching, at which the automatic control of the speed was switched to the manual speed control, the automatic control part 121 switches the automatic control of the steering to the manual steering control. For example, if the steering wheel 41 of the vehicle 2 is operated by the time when the waiting time has passed from the moment of speed control switching, the automatic control part 121 determines that the driver has performed the steering control operation, and switches the automatic control of the steering to the manual steering control. FIG. 2 is a diagram for explaining processing for determining whether the steering control operation has been performed.

In a case where the automatic control of the steering is performed without rotating the steering wheel 41, the automatic control part 121 determines that the steering control operation has been performed if the steering wheel 41 has been rotated from a reference position K during the automatic control of the steering. Specifically, the automatic control part 121 determines that the steering control operation has been performed if a rotation angle of the steering wheel 41 has become equal to or greater than a reference angle θ corresponding to a control amount of the steering under the autonomous driving control.

Processing for determining that the steering control has been performed by the driver may be performed by a contact detection sensor attached to the steering wheel 41. Specifically, the automatic control part 121 determines that the steering control operation has been performed when contact with an object has been detected by the contact detection sensor. The contact detection sensor is a capacitance sensor, and detects that the object is being contacted when a human hand touches the contact detection sensor, for example.

The automatic control part 121 sets, as the reference angle θ, an angle by which the steering wheel 41 is rotated to a position A corresponding to the control amount of the steering, immediately before executing the processing for determining whether the steering control operation has been performed. In other words, the automatic control part 121 sets, as the reference angle θ, a rotation angle of the steering wheel 41 required for the steering angle under the autonomous driving control. It should be noted that the rotation angle of the steering wheel 41 is 0 degree when the steering wheel 41 is at the reference position K, for example.

In a case where the automatic control of the steering is performed by rotating the steering wheel 41, the automatic control part 121 determines that the steering control operation has been performed if the rotation angle of the steering wheel 41 is outside of a determination range H, in which the reference angle θ is included. In this case, the automatic control part 121 sets, as the determination range H, a range that is equal to or less than an upper limit value B obtained by adding a predetermined value to the reference angle θ, and is equal to or greater than a lower limit value C obtained by subtracting the predetermined value from the reference angle θ. The predetermined value may be determined as appropriate, and is 1 degree, for example.

The automatic control part 121 may switch the automatic control of the steering to the manual steering control if the driver has performed a correct steering control operation, and may continue the automatic control of the steering if the driver has not performed the correct steering control operation. For example, if a turning direction of the vehicle 2 under the automatic control of the steering and a turning direction by the driver's steering control operation are the same, the automatic control part 121 determines that the correct steering control operation has been performed, and switches the automatic control of the steering to the manual steering control. If the turning direction under the automatic control of the steering and the turning direction by the driver's steering control operation are different from each other, the automatic control part 121 determines that the correct steering control operation has not been performed, and continues the automatic control of the steering.

As a specific example, the automatic control part 121 determines that the correct steering control operation has been performed if the automatic control of the steering is for a right turn and the driver's steering control operation is for a right turn. On the other hand, the automatic control part 121 determines that the correct steering control operation has not been performed if the automatic control of the steering is for the right turn and the direction of the driver's steering control operation is for a left turn. More specifically, the automatic control part 121 determines that the correct steering control operation has been performed if the driver's steering control operation is for the right turn when the automatic control of the steering is for the right turn, and the rotation angle of the steering wheel 41 is outside of the determination range H including the reference angle θ. The automatic control part 121 determines that the correct steering control operation has not been performed if the rotation angle of the steering wheel 41 is within the determination range H including the reference angle θ, even if the driver's steering control operation is for the right turn when the automatic control of the steering is for the right turn. By doing this, when the driver performs an erroneous operation that contradicts the autonomous driving control, the automatic control part 121 can prevent the erroneous operation from being reflected.

The automatic control part 121 stops the vehicle 2 unless the steering wheel 41 is operated by the time when the waiting time has passed from the moment of speed control switching. Specifically, the automatic control part 121 stops the engine and operates the brake to stop the vehicle 2 if the detected abnormality is an abnormality in the engine. Further, the automatic control part 121 reduces the output of the engine and operates an engine brake to stop the vehicle 2 if the detected abnormality is an abnormality in the brake. Specifically, the automatic control part 121 identifies an object around the vehicle 2 on the basis of a detection value detected by the sensor 3 immediately before the abnormality detection part 122 detects an abnormality in the sensor 3, and stops the vehicle 2 at a position where the identified object and the vehicle 2 do not collide with each other. In this manner, the automatic control part 121 stops the vehicle 2 when the driver of the vehicle 2 does not perform the steering control operation even after the waiting time has passed from the moment at which the automatic control of the speed was switched to the manual speed control, so that it is possible to prevent the vehicle 2 from continuing to travel in a state where there is an abnormality.

Figure 3:
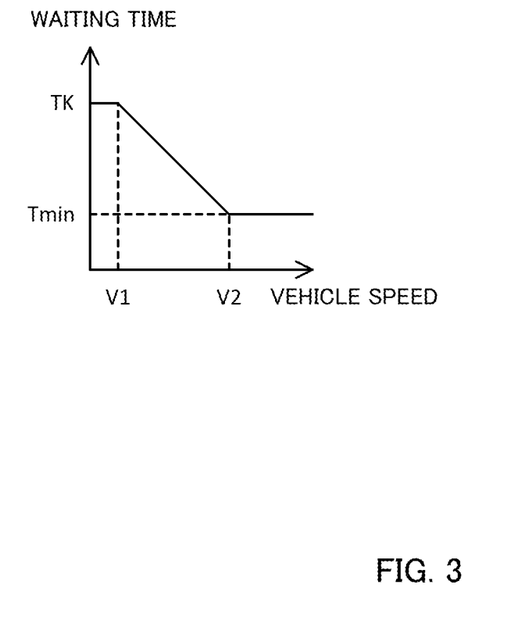
FIG. 3 is a diagram for explaining processing for setting a waiting time.

Depending on the state and surrounding situation of the vehicle 2, there can be a case where the driver's operation is required immediately and a case where the driver's operation is not required immediately. Accordingly, when the abnormality detection part 122 detects an abnormality, the automatic control part 121 sets a waiting time according to the state and surrounding situation of the vehicle 2. For example, the automatic control part 121 makes the waiting time shorter as the vehicle speed of the vehicle 2 is greater. FIG. 3 is a diagram for explaining processing for setting a waiting time. In FIG. 3, the horizontal axis represents a vehicle speed, and the vertical axis represents a waiting time. If the vehicle speed of the vehicle 2 is less than a first threshold V1, the automatic control part 121 determines, as the waiting time, a reference time TK before the driver of the vehicle 2 will be able to perform the steering control operation in response to the notification.

If the vehicle speed is equal to or greater than the first threshold V1 and less than a second threshold V2 that is greater than the first threshold V1, the automatic control part 121 makes the waiting time shorter than the reference time the vehicle speed of the vehicle 2 is greater. In other words, the automatic control part 121 determines a waiting time that is inversely proportional to the vehicle speed. In this manner, the automatic control part 121 stops the vehicle 2 when there is no driver's operation in a situation that necessitates the driver's operation immediately, so that it is possible to reduce the probability that the vehicle 2 collides with a moving object or a stationary object around the vehicle 2.

The automatic control part 121 sets a lower limit time Tmin as the waiting time if the vehicle speed is equal to or greater than the second threshold. The lower limit time Tmin is a minimum time it takes for the driver, who responds to the notification of an abnormality, to be able to perform the steering control operation. Thus, the automatic control part 121 can prevent the steering from being switched to the automatic control in a time that is shorter than the minimum time required for the driver to respond. As a result, the automatic control part 121 can prevent the vehicle 2 from being stopped even though the driver is attempting to perform the steering control operation.

Further, when a moving object is around the vehicle 2, it is desirable that the driver perform the steering control operation immediately or stop the vehicle 2 so as to prevent the vehicle 2 from colliding with the moving object. Accordingly, the automatic control part 121 makes the waiting time shorter than the reference time if a moving object has been detected on the basis of the detection value of the sensor 3, or if a moving object has been detected by the sensor 3. Due to this, the automatic control part 121 can immediately stop the vehicle 2 if there is no driver's operation in a situation that necessitates the driver's operation immediately. In addition, the automatic control part 121 makes the waiting time longer than the reference time if a moving object has not been detected by the sensor 3. By doing this, the automatic control part 121 can lengthen a time during which the driver's operation can be accepted, in a situation where the driver's operation is not required immediately.

First Modified Example

The notification control part 123 causes the output device 6 to provide notification that an abnormality has been detected if the abnormality detection part 122 detected the abnormality, but the embodiment is not limited to this. If the automatic control part 121 switches the automatic control of the speed to the manual speed control, the notification control part 123 may cause the output device 6 to provide notification that the automatic control of the speed has been switched to the manual speed control due to the detection of the abnormality. For example, the notification control part 123 causes the output device 6 to provide notification that the automatic control part 121 has switched the automatic control of the speed to the manual speed control due to the detection of the abnormality, at the same timing as when the automatic control part 121 switches the automatic control of the speed to the manual control.

Second Modified Example

It is desirable that control switching processing by the automatic control part 121 for switching the automatic control of the speed to the manual speed control, and abnormality notification processing by the notification control part 123 for notifying an abnormality be performed simultaneously. However, either the control switching processing or the abnormality notification processing could be executed first. Accordingly, the automatic control part 121 counts the waiting time from the earlier one of the moment of speed control switching or a moment of abnormality notification when the notification control part 123 causes the output device 6 to provide notification about the abnormality. For example, if the moment of abnormality notification is earlier than the moment of speed control switching, the abnormality detection part 122 counts the waiting time from the moment of abnormality notification. In this case, the automatic control part 121 switches the automatic control of the steering to the manual steering control if the steering control operation has been performed by the time at which the waiting time has passed from the moment at which the notification control part 123 caused the output device 6 to provide notification that the abnormality was detected. The automatic control part 121 causes the vehicle 2 to stop if the steering control operation has not been performed by the time at which the waiting time has passed from the moment at which the notification control part 123 caused the output device 6 to provide notification that the abnormality was detected.

[Processing for Switching Control]

Figure 4:
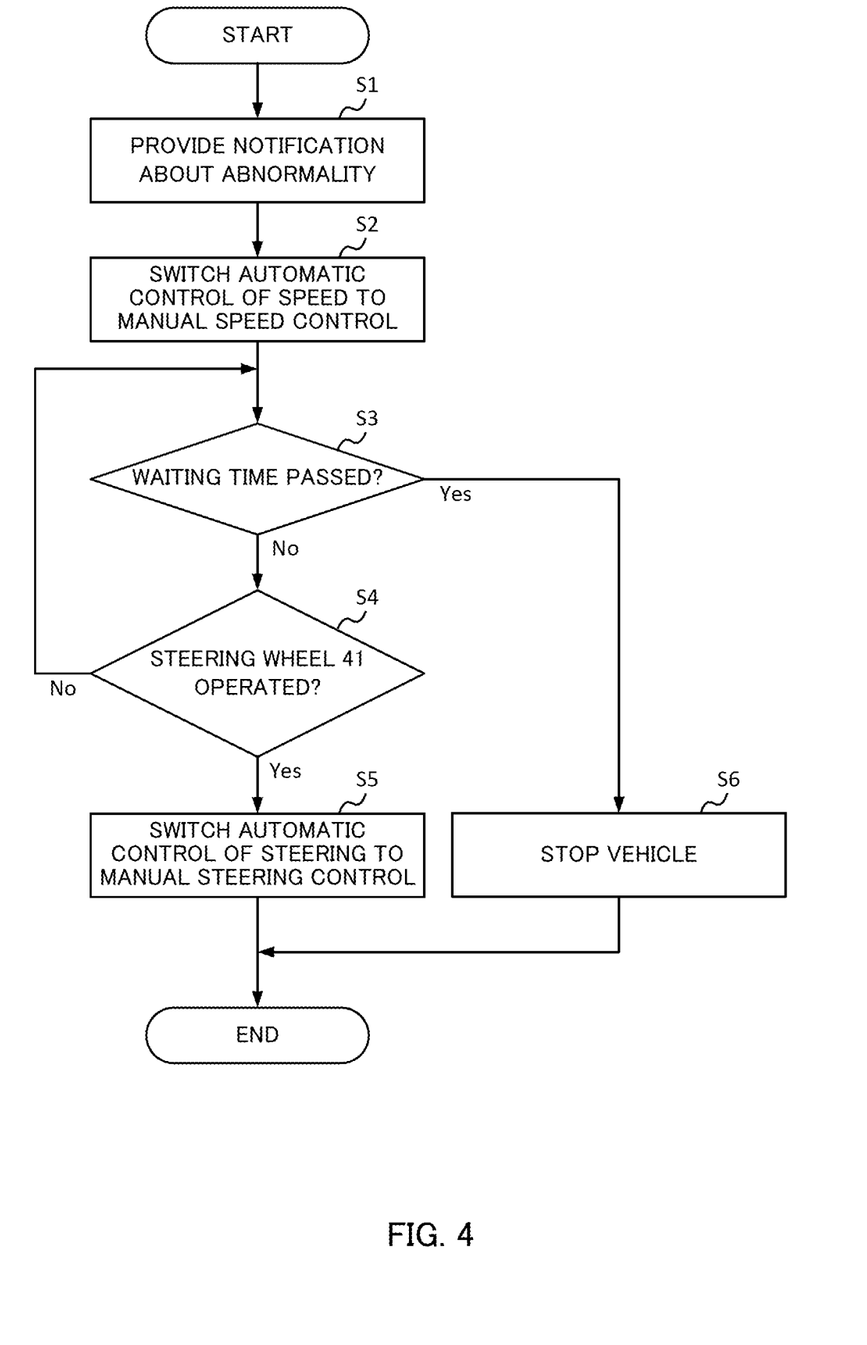
FIG. 4 is a flowchart showing an example of processing by the autonomous driving apparatus for switching control.

FIG. 4 is a flowchart showing an example of processing by the autonomous driving apparatus 1 for switching control. The processing shown by the flowchart of FIG. 4 is executed when the abnormality detection part 122 detects an abnormality during the automatic control of the speed and the steering by the automatic control part 121.

If the abnormality detection part 122 has detected an abnormality, the notification control part 123 causes the output device 6 to provide notification that the abnormality has been detected (step S1). Specifically, the abnormality detection part 122 causes the speaker of the output device 6 to output sound indicating that the abnormality has been detected, and causes the display of the output device 6 to display information indicating that the abnormality has been detected. If the abnormality detection part 122 has detected the abnormality, the automatic control part 121 switches the automatic control of the speed to the manual speed control in which the speed is controlled by the driver's operation (step S2). It should be noted that the processing of step S2 may be executed before step S1, or the processing of step S1 and the processing of step S2 may be executed in parallel.

The automatic control part 121 determines whether the waiting time has passed from the moment at which the automatic control of the speed was switched to the manual speed control (step S3). If the waiting time has not passed from the moment at which the automatic control of the speed was switched to the manual speed control ("No" in step S3), the automatic control part 121 determines whether the steering wheel 41 of the vehicle 2 has been operated (step S4). For example, the automatic control part 121 determines that the steering control operation has been performed if the rotation angle of the steering wheel 41 is outside of the determination range H including the reference angle θ, and the automatic control part 121 determines that the steering control operation has not been performed if the rotation angle of the steering wheel 41 is within the determination range H including the reference angle θ.

If the steering wheel 41 of the vehicle 2 has been operated ("Yes" in step S4), the automatic control part 121 switches the automatic control of the steering to the manual steering control (step S5). If the steering wheel 41 of the vehicle 2 has not been operated ("No" in step S4), the automatic control part 121 returns to the step S3. If the waiting time has passed from the moment at which the automatic control of the speed was switched to the manual speed control ("Yes" in step S3), the automatic control part 121 stops the vehicle 2 (step S6). For example, if the detected abnormality is an abnormality in the engine, the automatic control part 121 stops the engine and operates the brake to stop the vehicle 2.

[Effects of the Autonomous Driving Apparatus 1]

As described above, if the abnormality detection part 122 has detected at least one of an abnormality in the drive system of the vehicle and an abnormality in the sensor that detects surrounding situations when the autonomous driving apparatus 1 is controlling the steering and the speed automatically, the autonomous driving apparatus 1 switches the automatic control of the speed to the manual speed control in which the speed is controlled by the driver's operation, and continues the automatic control of the steering until the predetermined waiting time has passed from the moment at which the automatic control of the speed was switched to the manual speed control. In this manner, when the abnormality in the drive system of the vehicle 2 is detected, the automatic control part 121 continues the automatic control of the steering without switching the automatic control of the steering to the manual steering control. As a result, the automatic control part 121 can prevent the steering of the vehicle 2 from entering a state that is neither under the automatic control nor the manual control in a case where the driver cannot immediately operate the vehicle 2, so that it is possible to improve safety.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Effects of the new exemplary embodiments brought by the combinations also have the effects of the original exemplary embodiments.

What is claimed is:

1. An autonomous driving apparatus that automatically controls steering and speed of a vehicle to cause the vehicle to travel, the autonomous driving apparatus comprising:
an abnormality detection part that detects at least one of an abnormality in a drive system of the vehicle and an abnormality in a sensor that detects a surrounding situation, when the steering and the speed are automatically controlled; and
an automatic control part that switches automatic control of the speed to manual control, in which the speed is controlled by a driver's operation, when an abnormality has been detected by the abnormality detection part, and that continues automatic control of the steering until a predetermined waiting time has passed from a moment at which the automatic control of the speed was switched to the manual control,
wherein the automatic control part makes the waiting time shorter than a reference time when a moving object has been detected by the sensor, and the automatic control part makes the waiting time longer than the reference time when a moving object has not been detected by the sensor.

2. The autonomous driving apparatus according to claim 1, wherein
the automatic control part switches the automatic control of the steering to manual steering control when a steering device of the vehicle has been operated by the driver by a time at which the waiting time has passed.

3. The autonomous driving apparatus according to claim 1, wherein
the automatic control part switches the automatic control of the steering to the manual steering control when contact with a human hand has been detected by a contact detection sensor attached to a steering device of the vehicle by a time at which the waiting time has passed.

4. The autonomous driving apparatus according to claim 1, wherein
the automatic control part stops the vehicle when a steering device of the vehicle has not been operated by the driver by a time at which the waiting time has passed.

5. The autonomous driving apparatus according to claim 4, wherein, when the abnormality detection part detects an abnormality in the sensor, the automatic control part stops the vehicle at a position where the vehicle does not collide with an object around the vehicle that had been detected by the sensor before the abnormality was detected by the abnormality detection part.

6. The autonomous driving apparatus according to claim 4, wherein
the automatic control part stops an engine of the vehicle and operates a brake of the vehicle to stop the vehicle when an abnormality in the engine has been detected as an abnormality in the drive system, and
the automatic control part operates an engine brake to stop the vehicle when an abnormality in the brake has been detected as an abnormality in the drive system.

7. The autonomous driving apparatus according to claim 1, wherein
the automatic control part sets the waiting time to be shorter the greater a vehicle speed of the vehicle is.

8. The autonomous driving apparatus according to claim 1, comprising:
a notification control part that causes an output device to provide notification that the automatic control of the speed has been switched to the manual control due to detection of the abnormality, when the automatic control part has switched the automatic control of the speed to the manual control.

9. An autonomous driving apparatus that automatically controls steering and speed of a vehicle to cause the vehicle to travel, the autonomous driving apparatus comprising:
an abnormality detection part that detects at least one of an abnormality in a drive system of the vehicle and an abnormality in a sensor that detects a surrounding situation, when the steering and the speed are automatically controlled;
an automatic control part that switches automatic control of the speed to manual control, in which the speed is controlled by a driver's operation, when an abnormality has been detected by the abnormality detection part, and that continues automatic control of the steering until a predetermined waiting time has passed from a moment at which the automatic control of the speed was switched to the manual control; and
a notification control part that causes an output device to provide notification that the abnormality has been detected when the abnormality detection part has detected the abnormality, wherein
when a moment of abnormality notification, at which the notification control part caused the output device to provide notification about the abnormality, is earlier than a moment of speed control switching, at which the automatic control of the speed was switched to the manual control, the automatic control part counts the waiting time from the moment of abnormality notification, and
when the moment of speed control switching is earlier than the moment of abnormality notification, or when the moment of speed control switching is simultaneous with the moment of abnormality notification, the automatic control part counts the waiting time from the moment of speed control switching.

10. The autonomous driving apparatus according to claim 9, wherein
the automatic control part switches the automatic control of the steering to manual steering control when a steering device of the vehicle has been operated by the driver by a time at which the waiting time has passed.

11. The autonomous driving apparatus according to claim 9, wherein
the automatic control part switches the automatic control of the steering to manual steering control when a steering device of the vehicle has been operated by the driver by a time at which the waiting time has passed.

12. The autonomous driving apparatus according to claim 9, wherein
the automatic control part stops the vehicle when the steering device of the vehicle has not been operated by the driver by a time at which the waiting time has passed.

13. The autonomous driving apparatus according to claim 12, wherein, when the abnormality detection part detects an abnormality in the sensor, the automatic control part stops the vehicle at a position where the vehicle does not collide with an object around the vehicle that had been detected by the sensor before the abnormality was detected by the abnormality detection part.

14. The autonomous driving apparatus according to claim 12, wherein
   the automatic control part stops an engine of the vehicle and operates a brake of the vehicle to stop the vehicle when an abnormality in the engine has been detected as an abnormality in the drive system, and
   the automatic control part operates an engine brake to stop the vehicle when an abnormality in the brake has been detected as an abnormality in the drive system.

15. The autonomous driving apparatus according to claim 9, wherein
   the automatic control part sets the waiting time to be shorter the greater a vehicle speed of the vehicle is.

16. The autonomous driving apparatus according to claim 9, wherein the notification control part causes the output device to provide notification that the automatic control of the speed has been switched to the manual control due to detection of the abnormality, when the automatic control part has switched the automatic control of the speed to the manual control.

\* \* \* \* \*